US012764345B2

(12) United States Patent
Du et al.

(10) Patent No.: US 12,764,345 B2
(45) Date of Patent: Oct. 13, 2026

(54) REDUCING BLOCKINESS FOR CODECS

(71) Applicant: Apple Inc., Cupertino, CA (US)

(72) Inventors: Yixin Du, Milpitas, CA (US); Alexandros Tourapis, Los Gatos, CA (US); Alican Nalci, La Jolla, CA (US); Guoxin Jin, San Diego, CA (US); Hilmi Enes Egilmez, San Jose, CA (US); Hsi-Jung Wu, San Jose, CA (US); Jun Xin, San Jose, CA (US); Yeqing Wu, Cupertino, CA (US); Yunfei Zheng, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/945,408

(22) Filed: Nov. 12, 2024

(65) Prior Publication Data

US 2025/0071345 A1 Feb. 27, 2025

Related U.S. Application Data

(62) Division of application No. 17/956,444, filed on Sep. 29, 2022, now abandoned.

(Continued)

(51) Int. Cl.
*H04N 19/86* (2014.01)
*H04N 19/117* (2014.01)

(Continued)

(52) U.S. Cl.
CPC ........... *H04N 19/86* (2014.11); *H04N 19/117* (2014.11); *H04N 19/139* (2014.11); *H04N 19/176* (2014.11); *H04N 19/82* (2014.11)

(58) Field of Classification Search
CPC ............................ H04N 19/86; H04N 19/117

(Continued)

(56) References Cited

U.S. PATENT DOCUMENTS

2019/0238890 A1 8/2019 Tsai et al.
2021/0203985 A1 7/2021 Nalci et al.

(Continued)

OTHER PUBLICATIONS

Benjamin Bross, Jianle Chen, Shan Liu, Ye-Kui Wang, "Versatile Video Coding, Draft 10", Joint Video Experts Team (JVET) of ITU-T SG 16 WP 3 and ISO/IEC JTC 1/SC 29/WG 11 19th Meeting: by teleconference, Jun. 22-Jul. 1, 2020 (Year: 2020).

(Continued)

*Primary Examiner* — Amir Shahnami
(74) *Attorney, Agent, or Firm* — Fish & Richardson P.C.

(57) ABSTRACT

Disclosed is a method that includes receiving an image frame having a plurality of coded blocks, determining a prediction unit (PU) from the plurality of coded blocks, determining one or more motion compensation units arranged in an array within the PU, and applying a filter to one or more boundaries of the one or more motion compensation units. Also disclosed is a method that includes receiving a reference frame that includes a reference block, determining a timing for deblocking a current block, performing motion compensation on the reference frame to obtain a predicted frame that includes a predicted block, performing reconstruction on the predicted frame to obtain a reconstructed frame that includes a reconstructed PU, and applying, at the timing for deblocking the current block, a deblocking filter based on one or more parameters to the reference block, the predicted block, or the reconstructed PU.

28 Claims, 12 Drawing Sheets

Related U.S. Application Data

(60) Provisional application No. 63/395,318, filed on Aug. 4, 2022.

(51) Int. Cl.
*H04N 19/139* (2014.01)
*H04N 19/176* (2014.01)
*H04N 19/82* (2014.01)

(58) Field of Classification Search
USPC .................................................... 375/240.02
See application file for complete search history.

(56) References Cited

U.S. PATENT DOCUMENTS

| | | | | |
|---|---|---|---|---|
| 2021/0360285 | A1* | 11/2021 | Urban | H04N 19/105 |
| 2022/0007013 | A1 | 1/2022 | Zhu et al. | |
| 2023/0107138 | A1 | 4/2023 | Zhang et al. | |
| 2024/0048776 | A1 | 2/2024 | Du et al. | |

OTHER PUBLICATIONS

Lu et al., "Optical Flow Motion Vecotr Refinement for AV2," CWG-B041 version 3, Alliance for Open Media Codec Working Group, Sep. 20, 2021, 11 pages.
Norkin, "Deblocking filter for AVM," CWG-C014 version 5, Alliance for Open Media Codec Working Group, Mar. 6, 2022, 37 pages.
Wu et al., "Temporal Interpolated Prediction Mode," CWG-C007 version 3, Alliance for Open Media Codec Working Group, Feb. 23, 2022, 11 pages.

* cited by examiner

REDUCING BLOCKINESS FOR CODECS

CROSS-REFERENCE TO RELATED APPLICATION

This application is a divisional of, and claims priority to, U.S. patent application Ser. No. 17/956,444, filed Sep. 29, 2022, which claims priority to U.S. Provisional Patent Application No. 63/395,318, filed Aug. 4, 2022, the entire contents of each of which are incorporated herein by reference.

BACKGROUND

Computer systems can be used to generate and display visual content. In general, a computer system encodes a frame of visual information into a bit stream and transmits the bit stream to a display device. The display device displays the frame by decoding the bit stream.

Hybrid video coding generally refers to a type of commonly-used video coding techniques. In modern hybrid video coding, inter prediction is an important technique for reducing temporal redundancy between video frames. Inter prediction uses motion information, such as motion vectors (MVs) and reference frames, to predict the visual presentation of a block of pixels from a corresponding reference block in the reference frames. Specifically, the video encoder obtains the motion information and sends the motion information to the decoder to for prediction. The block to which the motion information is associated is referred to as a prediction unit (PU).

SUMMARY

This disclosure relates to techniques for reducing blockiness for Codecs.

In accordance with one aspect of the present disclosure, a method includes receiving an image frame comprising a plurality of coded blocks. The method includes determining a PU from the plurality of coded blocks. The method includes determining one or more motion compensation units arranged in an array within the PU. The method also includes applying a filter to one or more boundaries of the one or more motion compensation units.

In accordance with one aspect of the present disclosure, a method includes receiving a reference frame that comprises a reference block. The method includes determining a timing for deblocking a current block. The method includes performing motion compensation on the reference frame to obtain a predicted frame that comprises a predicted block. The method includes performing reconstruction on the predicted frame to obtain a reconstructed frame that comprises a reconstructed PU. The method includes, at the timing for deblocking the current block, applying a deblocking filter based on one or more parameters to at least one of: the reference block, the predicted block, or the reconstructed PU.

The details of one or more implementations of these systems and methods are set forth in the accompanying drawings and the description below. Other features, objects, and advantages of these systems and methods will be apparent from the description and drawings, and from the claims.

DETAILED DESCRIPTION

In existing techniques, all pixels in a PU can be predicted based on the same motion information, with the assumption that all pixels in the same PU share the same motion information. For adjacent PUs, motion information can vary substantially. Decoding these PUs can lead to blocky artifacts observed along the block boundaries. Therefore, deblocking filters are often used to remove the artifacts and improve the decoded video quality.

To improve prediction resolution and improve video quality, some inter prediction techniques have been adopted to allow the use of different motion information to decode pixels within the same PU. For example, a PU can be divided into multiple small sub-PUs, such as an array of 4×4 sub-PUs, which correspond to multiple sub-blocks in a reference frame. Each sub PU is composed of pixels that share the same motion information, while different sub-PUs can have different motion information. In inter prediction, a sub-PU can be referred to as a motion compensation unit. Examples of inter prediction techniques include TIP, OPFL vector refinement, and warp/affine motion, each referring to a mode for coding a reference block.

Different motion information of the sub-PUs can lead to blocky artifacts along the boundaries of the sub-PUs. In at least some implementations, existing deblocking techniques may not provide adequate filtering to address the blocky artifacts thus occurring. In addition, certain reference frames, such as those coded in the TIP mode, may not be adequately processed by the normal in-loop filtering process. As a result, blocky artifacts in a reference frame can propagate to the PU that is generated using the reference frame. In this case, the blocky artifacts can occur not only at sub-PU boundaries but anywhere within the PU. It is challenging for existing filtering techniques to remove the blocky artifacts thus occurring.

This disclosure is made in light of the above challenges. As described in detail below, implementations of this disclosure can reduce blocky artifacts arising from inter prediction, especially when one or more of TIP mode, OPFL vector refinement mode, or warp/affine motion mode are enabled. As such, implementations of this disclosure can advantageously improve coding efficiency and visual quality.

Figure 1:
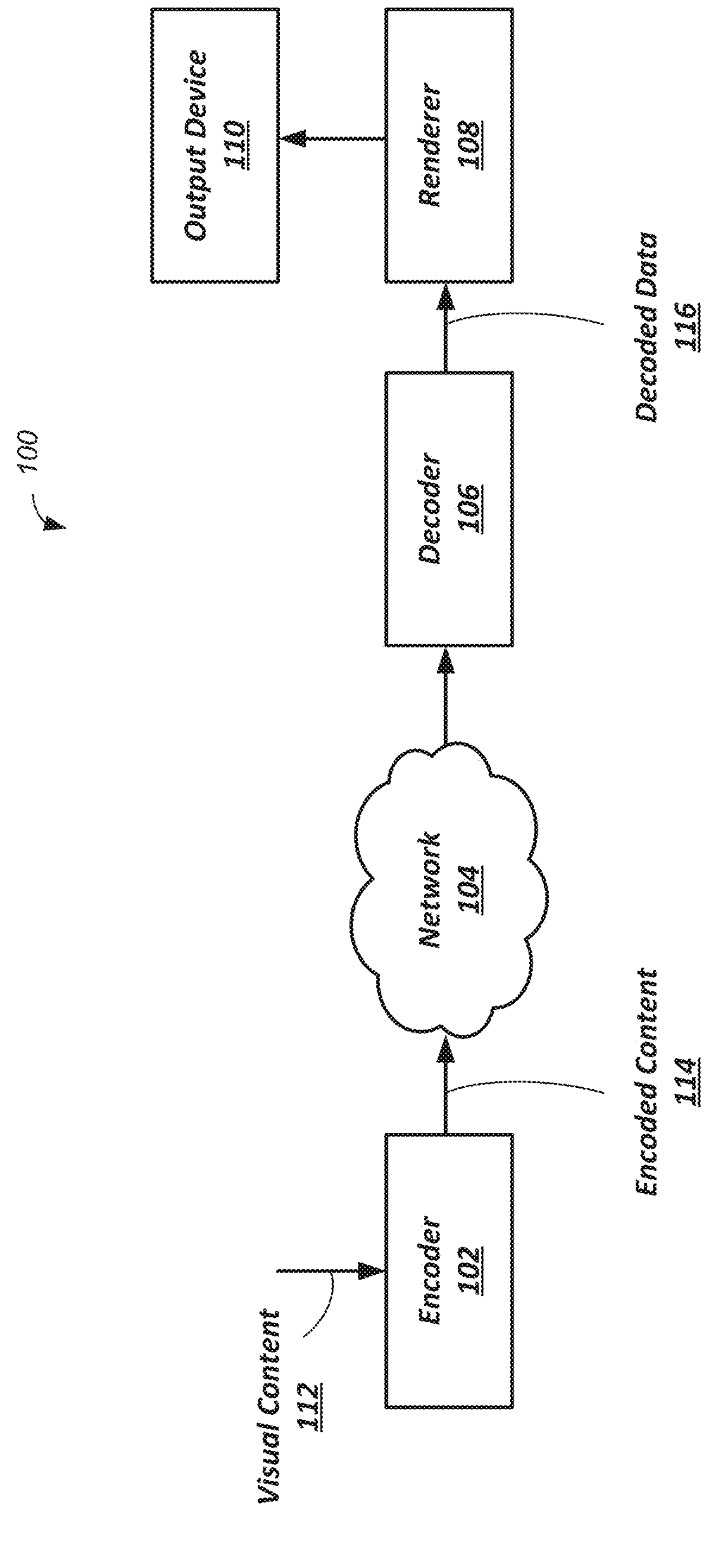
FIG. 1 is a diagram of an example system for encoding and decoding visual content, according to some implementations.

FIG. 1 is a diagram of an example system 100 for processing and displaying visual content. The system 100 includes an encoder 102, a network 104, a decoder 106, a renderer 108, and an output device 110. During an example operation of the system 100, the encoder 102 receives information regarding visual content 112. Visual content 112 can be represented as, e.g., polygon mesh.

The encoder 102 generates encoded content 114 based on the visual content 112. The encoded content 114 includes information representing the characteristics of the visual content 112, and enables computer systems (e.g., the system 100 or another system) to recreate the visual content 112 or approximation thereof. The encoded content 114 can include one or more data streams (e.g., bit streams) that indicate the positions, colors, textures, visual patterns, opacities, and/or other characteristics associated with the visual content 112 (or a portion thereof).

The encoded content 114 is provided to a decoder 106 for processing. In some implementations, the encoded content 114 can be transmitted to the decoder 106 via a network 104. The network 104 can be any communications networks through which data can be transferred and shared. For example, the network 104 can be a local area network (LAN) or a wide-area network (WAN), such as the Internet. The network 104 can be implemented using various networking interfaces, for instance wireless networking interfaces (e.g., Wi-Fi, Bluetooth, or infrared) or wired networking interfaces (e.g., Ethernet or serial connection). The network 104 also can include combinations of more than one network, and can be implemented using one or more networking interfaces.

The decoder 106 receives the encoded content 114, and extracts information regarding the visual content 112 included in the encoded content 114 (e.g., in the form of decoded data 116). The decoder 106 then provides the decoded data 116 to the renderer 108.

The renderer 108 renders content based on the decoded data 116, and presents the rendered content to a user using the output device 110. As an example, if the output device 110 is configured to present content according to two dimensions (e.g., using a flat panel display, such as a liquid crystal display or a light emitting diode display), the renderer 108 can render the content according to two dimensions and according to a particular perspective, and instruct the output device 110 to display the content accordingly. As another example, if the output device 110 is configured to present content according to three dimensions (e.g., using a holographic display or a headset), the renderer 108 can render the content according to three dimensions and according to a particular perspective, and instruct the output device 110 to display the content accordingly.

In some implementations, the decoder 106 enables one or more inter prediction modes, such as TIP, OPFL vector refinement, and warp/affine motion, to process the encoded content 114. For example, the decoder 106 can use inter prediction techniques to compensate for the motion between multiple frames.

In the TIP mode, information pieces in two reference frames, $F_{i-1}$ and $F_{i+1}$, are combined and interpolated to form a TIP frame. The TIP frame can be used as an additional reference frame of the current frame or directly output as the reconstructed/decoded frame of the current frame. The size of the interpolation unit and the motion compensation unit in the TIP mode can be, e.g., 8×8 pixels for the luma component and 8×8 pixels for the chroma component. These units can be smaller than the size of a PU or a Transform Unit (TU). In some implementations, the TIP mode is controlled by a parameter TIP_frame_mode. For example, when TIP_frame_mode equals 0, the TIP mode is disabled. When TIP_frame_mode equals 1, the TIP mode is enabled, the TIP frame is used as an additional reference frame, and the current frame is normally coded. When TIP_frame_mode equals 2, the TIP mode is enabled, the TIP frame is directly output as the reconstructed/decoded frame of the current frame, and no coding is applied to the current frame.

The OPFL vector refinement mode is an OPFL-based approach to refine MVs approach to refine motion vectors (MVs) for compound prediction. Specifically, the OPFL equation is applied to formulate a least squares problem. In solving the problem, fine motions are derived from gradients of compound inter prediction samples. With the fine motions, the MV per sub-block (e.g., sub-PU) within a PU is further refined, thus enhancing inter prediction quality. The unit size for MV refinement can be determined based on the PU size. For example, for a PU with 8×8 pixels, the MVs are refined per subblock of 4×4 pixels. For PUs larger than 8×8 pixels, the MVs are refined per subblock of 8×8 pixels. For PUs of sub-8×8 sizes (e.g., 4×4, 4×8, 8×4, 4×16, or 16×4 pixels), MV refinement is not applied.

Warped motion compensation uses an affine model which can be represented by the following equation:

$$\begin{bmatrix} x' \\ y' \end{bmatrix} = \begin{bmatrix} a_1 & a_2 & a_3 \\ b_1 & b_2 & b_3 \end{bmatrix} \cdot \begin{bmatrix} x \\ y \\ 1 \end{bmatrix},$$

where [x, y] are coordinates of the original pixel and [x', y'] are the warped coordinates of the reference block. Up to six parameters can be used to specify the warped motion. In particular, $a_3$ and $b_3$ specify a conventional translational MV, $a_1$ and $b_2$ specify the scaling along the MV, and $a_2$ and $b_1$ specify the rotation. Warped motion compensation block unit size can be smaller than the size of a PU or TU.

Besides TIP, OPFL vector refinement, and warp/affine motion, inter prediction techniques also include transform-skip, single inter prediction (e.g., NEWMV and NEARMV), and compound inter prediction (e.g., NEWNEWMV, NEARNEWMV, NEWNEARMV, and NEARNERAMV). These techniques are readily understood by one of ordinary skill in the art and thus are not described in this specification.

In some implementations, one or more filters are applied by the decoder 106 to reduce the blockiness and improve the quality of visual content. Examples of the one or more filters include a deblocking filter, a constrained directional enhancement filter (CDEF), a cross-component sample offset (CCSO) filter, a loop restoration (LR) filter, an adaptive loop filter, and a sample adaptive offset (SAO) filter.

A deblocking filter is applied to reduce blocking artifacts. The deblocking filter operates on samples located at the TU/PU boundary. The maximum length of filtering is determined by the sizes of a previous block and the current block. The final filtering length is determined for each 4-sample-long part of the block boundary based on the sample values and one or more thresholds. For example, q_threshold and side_threshold can be used to evaluate the signal smoothness on each side of the block boundary. AOMedia Video Model (AVM) filter is an example of the deblocking filter. In AVM, the maximum number of samples modified by the AVM filter is 1 to 12 samples from each side of a block boundary for a luma component, and 1 to 5 samples for a chroma component.

Figure 2A:
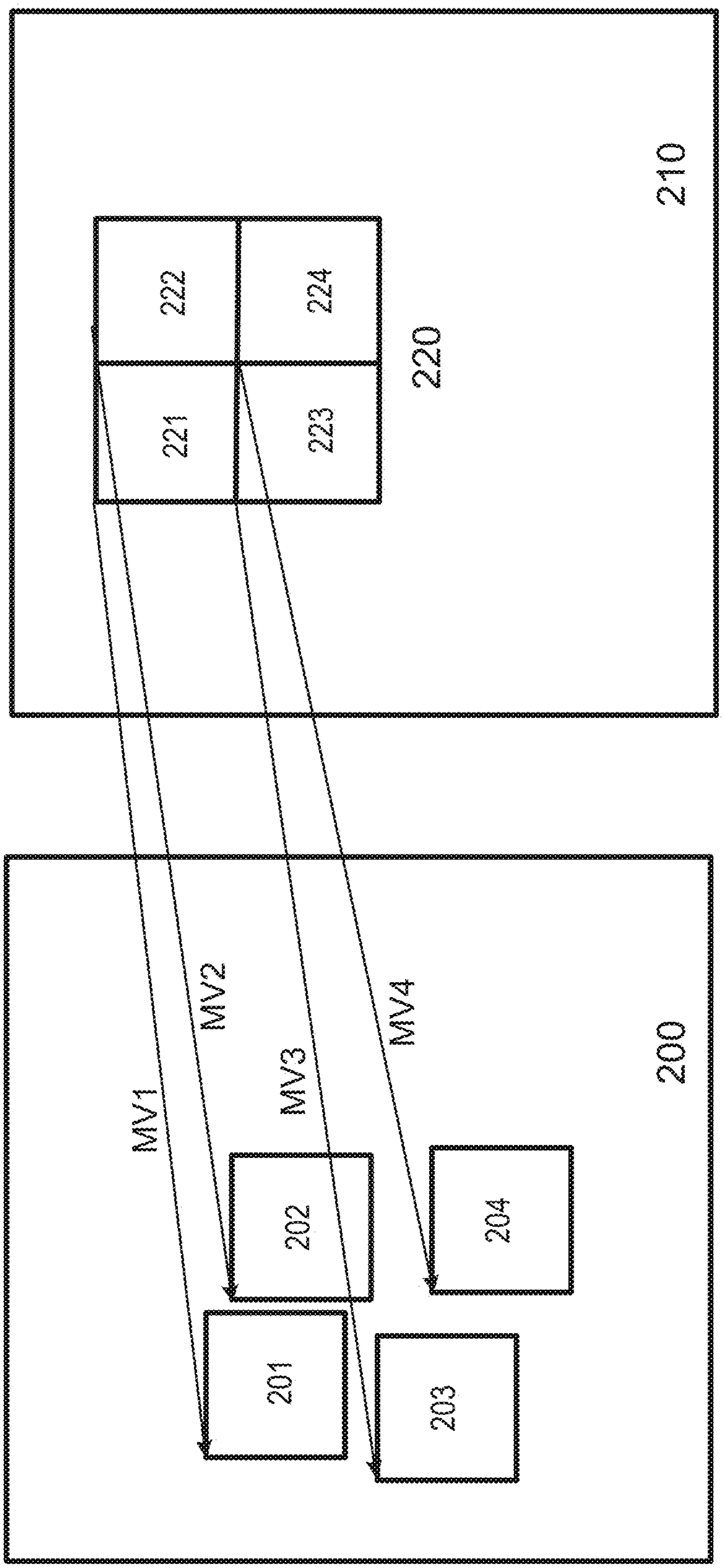
FIG. 2A illustrates the prediction of an example PU, according to some implementations.

FIG. 2A illustrates the prediction of an example PU 220 within a current frame 210, according to some implementations. The prediction is based on a reference frame 200 and can use one or more inter prediction techniques described above. The prediction illustrated in FIG. 2A can be performed by, e.g., decoder 106 of FIG. 1.

In FIG. 2A, PU 220 is divided into 4 sub-PUs, 221-224, arranged in a 2×2 array. Sub-PUs 221-224 are predicted based on sub-blocks 201-204, respectively, within reference frame 200. To compensate for the movement between reference frame 200 and current frame 210, the prediction uses MV1-MV4 corresponding to sub-PUs 221-224, respectively.

Figure 2B:
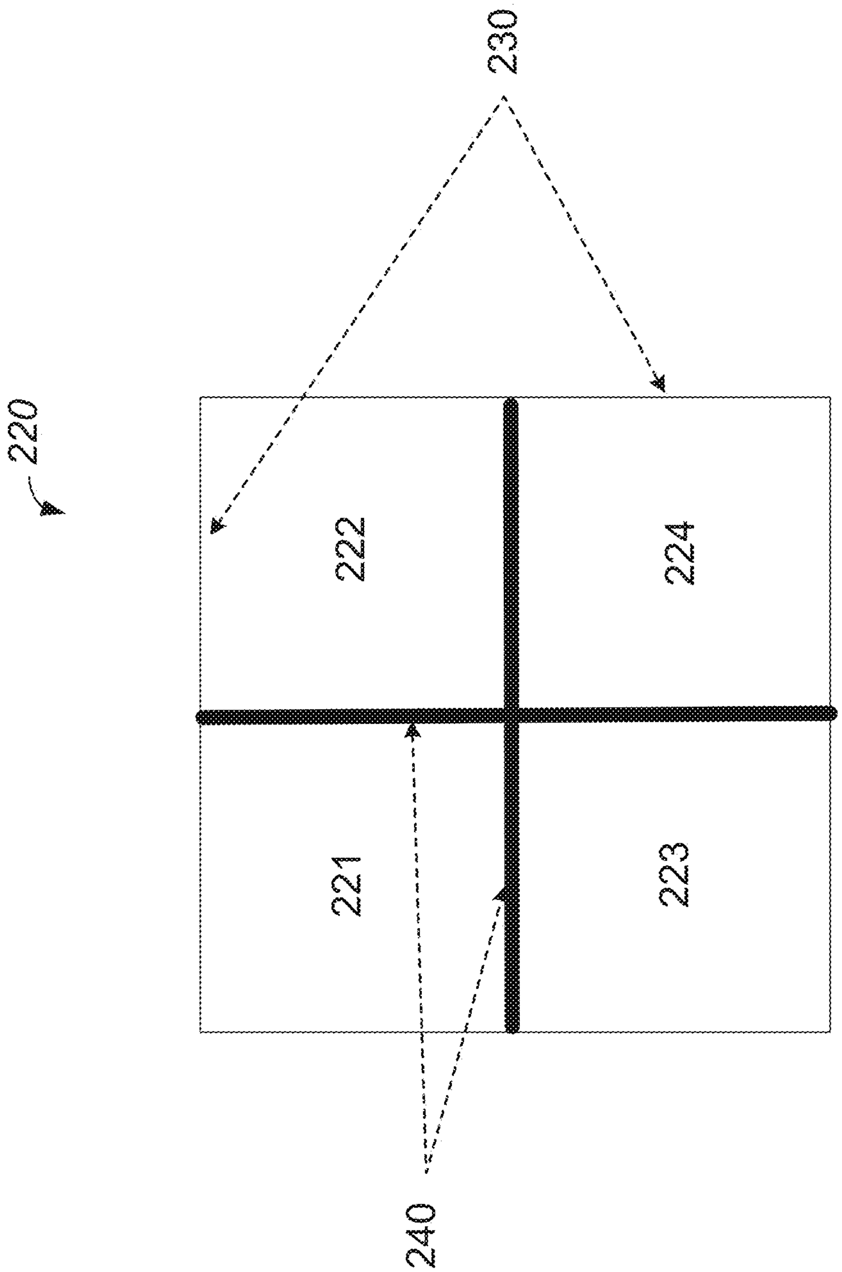
FIG. 2B illustrates the division of the example PU in FIG. 2A into 4 sub-PUs, according to some implementations.

FIG. 2B illustrates the division of PU 220 in FIG. 2A into 4 sub-PUs 221-224, according to some implementations. Sub-PUs 221-224 are arranged in a 2×2 array. Thus, each of sub-PUs 221-224 has two edges that form part of outer boundaries 230 (illustrated in thin lines) of PU 220 and another two edges that form inner boundaries 240 (illustrated in thick lines) separating two adjacent sub-PUs.

As described above, existing deblocking techniques only filter samples at PU boundaries but may not filter samples at motion compensation unit boundaries. Different from the existing techniques, one or more implementations apply a filter to not only the PU boundaries (e.g., outer boundaries 230) but the motion compensation unit boundaries (e.g., inner boundaries 240) and their proximities. The filter applied can be, e.g., a deblocking filter, a CDEF, a CCSO filter, a LR filter, an adaptive loop filter, or an SAO filter. With this feature, the blockiness of the PU can be reduced.

As also described above, it is challenging for existing in-loop filtering techniques to adequately address the blockiness in a reference frame. For example, in the TIP mode, an interpolated TIP frame or block may contain blocking artifacts, but existing techniques may not apply a filter to address these blocking artifacts until the interpolated TIP frame or block is used as a reference frame for prediction. As such, because the motion vectors used in the prediction can point to any directions, it is possible that the blocking artifacts, which propagate from the reference frame or block to the current frame, do not align with the PU grids.

Figure 3:
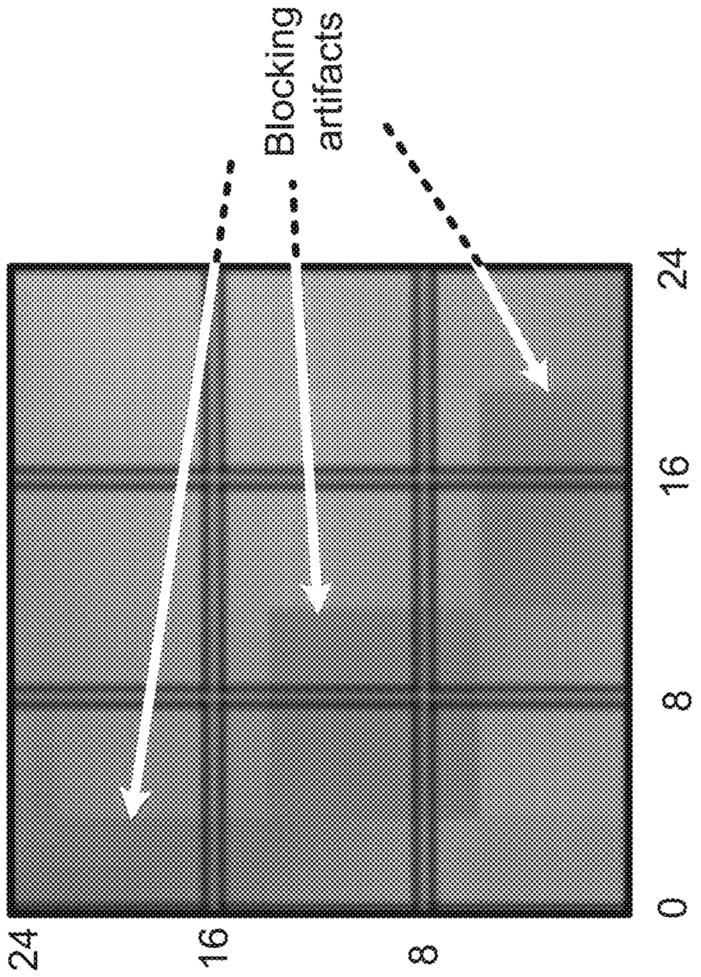
FIG. 3 illustrates the misalignment of blocking artifacts with PU grids as a result of inter prediction.

FIG. 3 illustrates the misalignment of blocking artifacts with PU grids. In FIG. 3, 9 PUs in a reconstructed frame are arranged in a 3×3 grid, with each PU having 8×8 pixels. These PUs are generated based on a reference frame that has unfiltered blocking artifacts. These blocking artifacts do not fully align with the 3×3 grid, as can be seen on FIG. 3. As a result, existing in-loop filters, which are only applied after reconstruction, may not adequately address these blocking artifacts in the PUs.

Figure 4A:
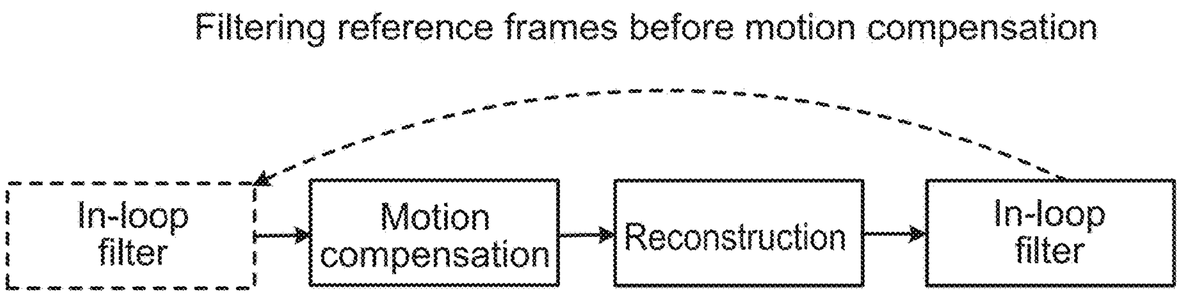
FIG. 4A illustrates an example procedure of applying an in-loop filter, according to some implementations.
Figure 4B:
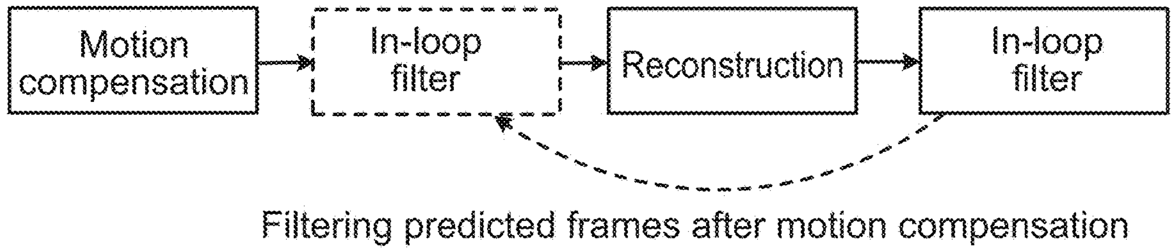
FIG. 4B illustrates another example procedure of applying an in-loop filter, according to some implementations.

One or more implementations of this disclosure address the blocking artifacts illustrated in FIG. 3. In particular, one or more implementations apply an in-loop filter, which can be a deblocking filter or a filter of other type, at a different stage of the decoding process. For example, instead of or in addition to applying an in-loop filter after reconstruction, some implementations apply the in-loop filter (i) to the reference frame before motion compensation, as illustrated in FIG. 4A, or (ii) to the predicted frame after motion compensation but before reconstruction, as illustrated in FIG. 4B. By applying the in-loop filter at early stages, the blocking artifacts in the reference frame can be eliminated or reduced. As a result, the reconstructed frame can have better quality.

Example decoding and deblocking procedures are described below with reference to FIGS. 5A-5C. The three example deblocking procedures differ primarily in the filtering timing, which can be pre-configured or adaptively configured by a computer system such as system 100 of FIG. 1. The below-described examples and other similar implementations can be performed by components of system 100, such as decoder 106, of FIG. 1. In addition, the below-described implementations and other similar implementations may or may not be combined with the features described with reference to FIGS. 2A-2B. The description below with reference to FIGS. 5A-5C assumes the reference frame is coded in the TIP mode, although the implementations can also apply to decoding frames with other inter prediction techniques.

Figure 5A:
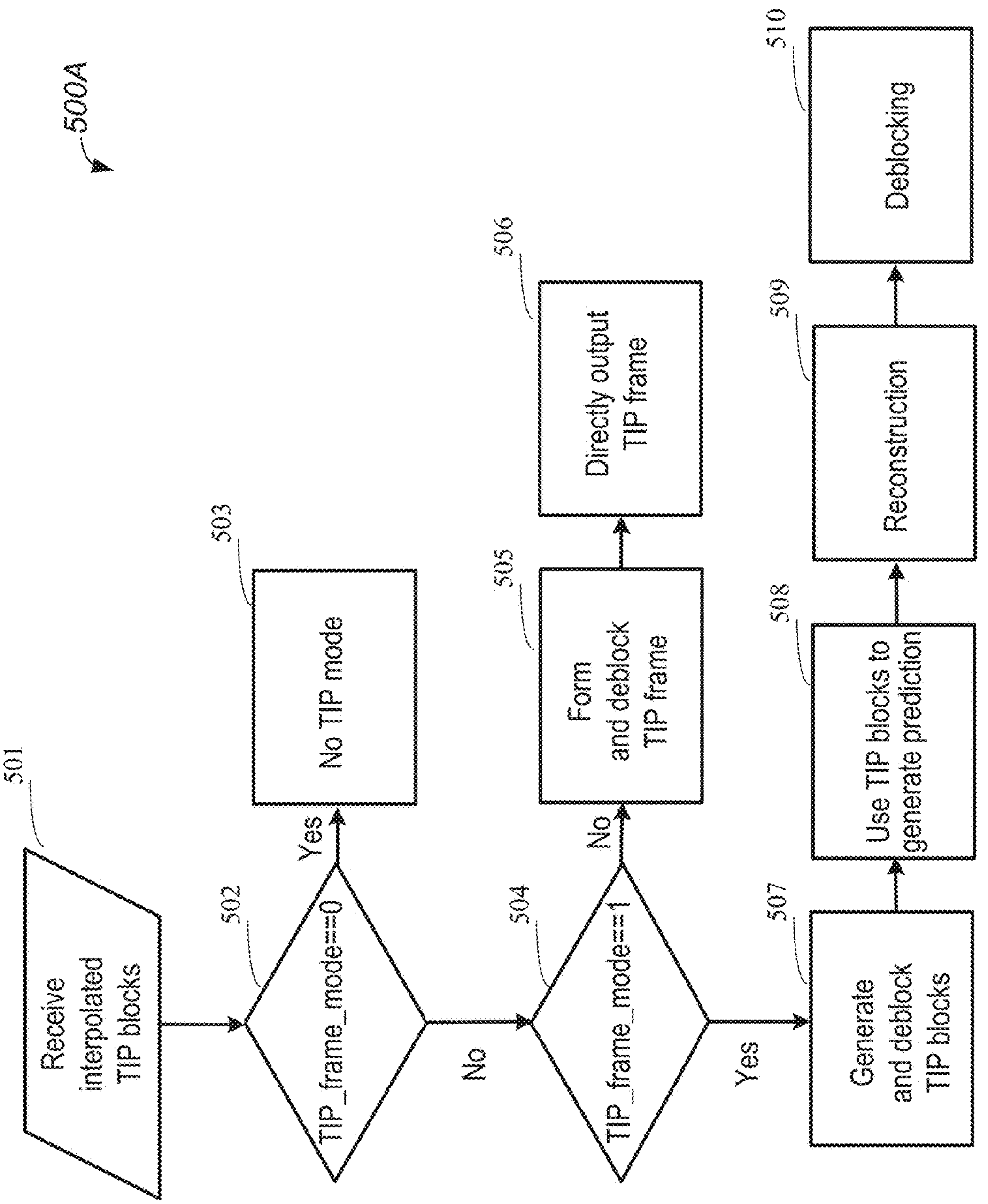
FIG. 5A illustrates an example decoding procedure, according to some implementations.

FIG. 5A illustrates an example decoding procedure 500A, according to some implementations. Decoding procedure 500A can be applied to samples of one or more interpolated TIP blocks.

At 501, procedure 500A involves receiving interpolated TIP blocks from, e.g., encoder 102 of FIG. 1, for potential deblocking. The TIP blocks can be referred to as "current blocks" as opposed to reference blocks.

At 502, procedure 500A involves checking a value of a parameter, such as TIP_frame_mode, to determine a configuration of the TIP mode. If TIP_frame_mode is determined as equal to 0, the TIP mode is disabled at 503 and procedure 500A can proceed to filtering the current blocks using existing techniques. Otherwise, the TIP mode is enabled and procedure 500A moves forward to 504.

At 504, procedure 500A involves further checking the value of TIP_frame_mode. If TIP_frame_mode is determined as not equal to 0 or 1, procedure 500A proceeds to 505 to form a TIP frame by, e.g., combining and interpolating two reference frames. After deblocking the TIP frame at 505, procedure 500A moves to 506 to directly output the TIP frame.

If TIP_frame_mode is determined as equal to 1, procedure 500A proceeds to 507 to generate TIP blocks and deblock the TIP blocks using, e.g., an in-loop filter. The TIP blocks are then used as reference blocks at 508 to generate PUs, followed by reconstruction at 509 and post-reconstruction deblocking at 510.

According to procedure 500A, when TIP_frame_mode is set to 2, deblocking is applied to TIP blocks after they are interpolated and before they are used as reference blocks. Thanks to the "pre-treatment" of the reference blocks, blocking artifacts in the reference blocks can be filtered and misalignment illustrated in FIG. 3 can be reduced.

Figure 5B:
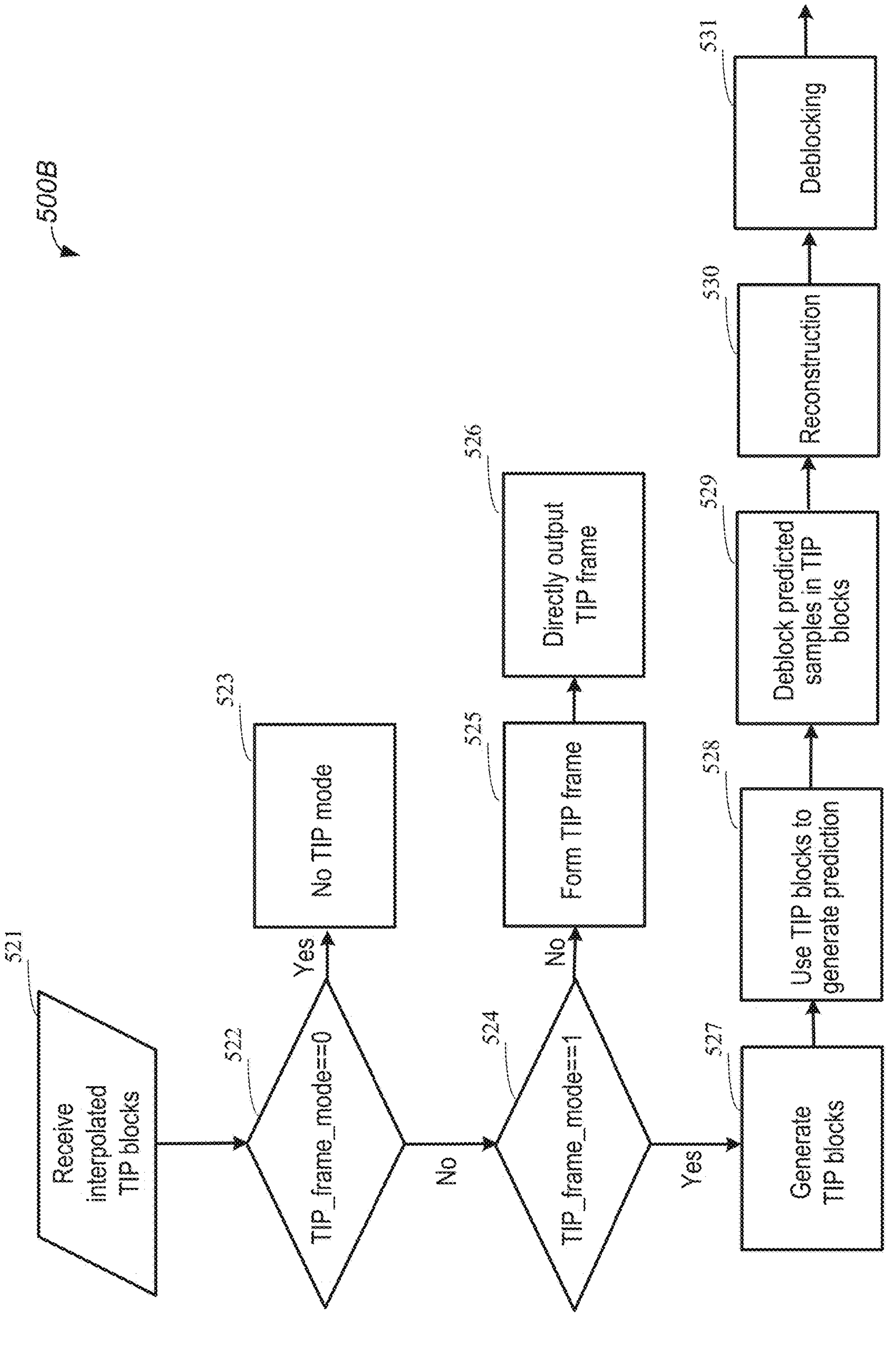
FIG. 5B illustrates another example decoding procedure, according to some implementations.

FIG. 5B illustrates another example decoding procedure 500B, according to some implementations. Similar to procedure 500A, procedure 500B can be applied to samples of one or more interpolated TIP frames or blocks. In procedure 500B, 521-526 can be substantially the same as 501-506 of procedure 500A. Accordingly, description of 521-526 is omitted for brevity.

At 527 of procedure 500B, the TIP blocks are generated on the fly. Different from procedure 500A, the generated TIP blocks are not deblocked at 527 but are used as reference blocks in the prediction at 528 to generate PUs.

After prediction, the TIP blocks in the PUs are deblocked at 529 using, e.g., an in-loop filter, followed by reconstruction at 530 and post-reconstruction deblocking at 531.

It can be seen that procedure 500B differs from procedure 500A primarily in that the pre-reconstruction deblocking is applied after prediction, i.e., after motion compensation.

Despite this difference, the "pre-treatment" of the reference blocks in procedure 500B also helps to reduce blocking artifacts and misalignment.

Figure 5C:
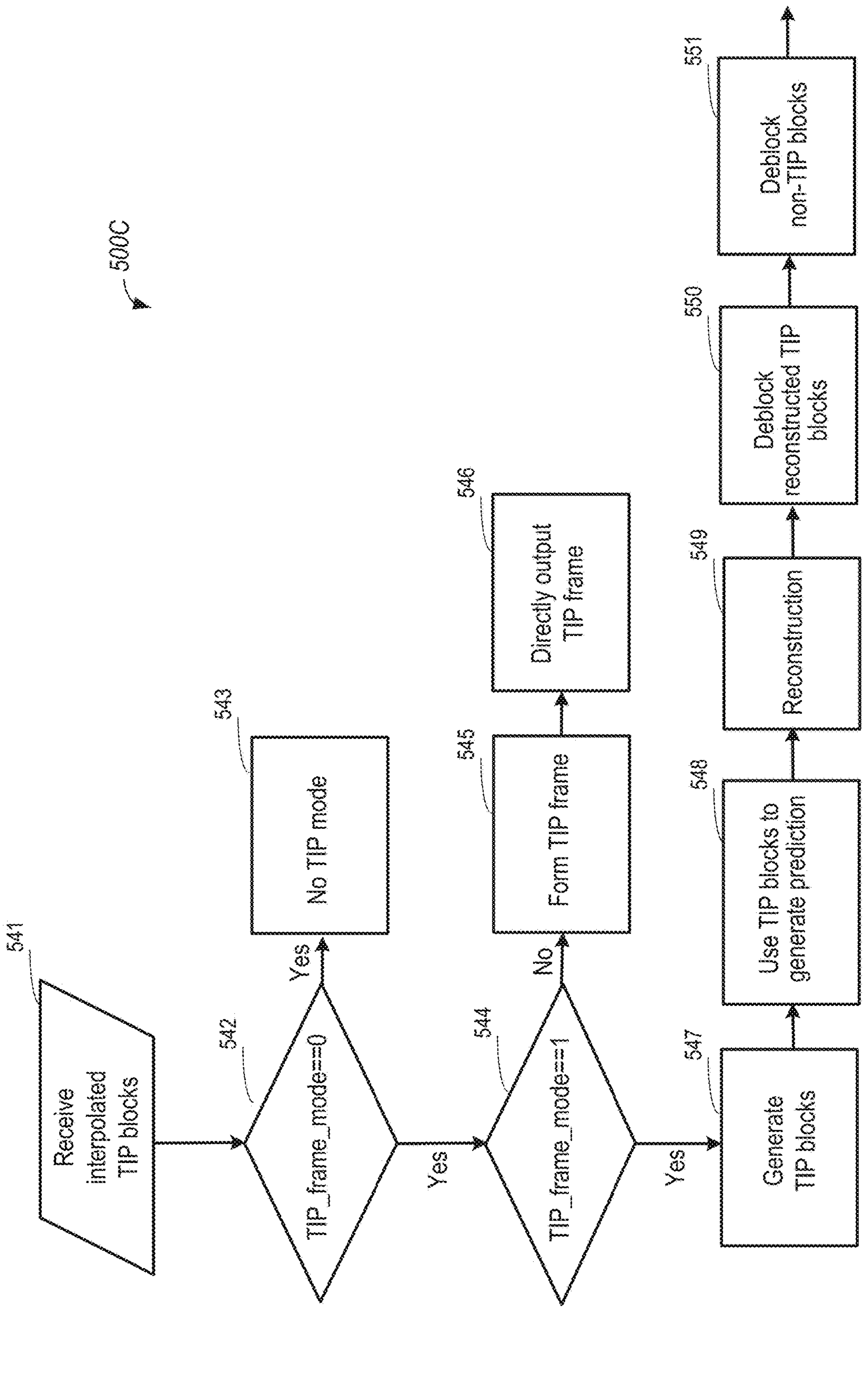
FIG. 5C illustrates another example decoding procedure, according to some implementations.

FIG. 5C illustrates another example decoding procedure 500C, according to some implementations. Similar to procedure 500A, procedure 500C can be applied to samples of one or more interpolated TIP frames or blocks. In procedure 500C, 541-546 can be substantially the same as 501-506 of procedure 500A. Accordingly, description of 541-546 is omitted for brevity.

At 547 of procedure 500C, the TIP blocks are generated on the fly. Different from procedure 500A, the generated TIP blocks are not deblocked at 547 but are used as reference blocks in the prediction at 548 to generate PUs.

After prediction, the TIP blocks in the PUs are not deblocked but proceed to reconstruction at 549. That is, procedure 500C does not involve pre-reconstruction deblocking of the TIP blocks.

After reconstruction, the reconstructed TIP blocks are deblocked at 550 using, e.g., an in-loop filter. In addition, the reconstructed non-TIP blocks (i.e., blocks that are not predicted based on the TIP blocks generated at 547) are deblocked at 551, using, e.g., another in-loop filter. It is noted that, in different implementations, 550 may take place before, simultaneously with, or after 551.

It can be seen that procedure 500C differs from procedure 500A and procedure 500B primarily in that procedure 500C does not involve pre-reconstruction deblocking of the TIP blocks. Instead, procedure 500C separately deblocks the TIP blocks and the non-TIP blocks after reconstruction. Separate treatment of TIP blocks allows for applying a filter particularly tailored for the blocking artifacts in the TIP blocks, as opposed to applying the same filter equally to all reconstructed blocks, TIP or non-TIP. Procedure 500C thus can help to reduce blocking artifacts and misalignment from the TIP mode.

The decoding process in some implementations, such as the implementations described with reference to FIGS. 1 and 4A-5C, have one or more features described below. These features relate to various configurations of the decoding process and can be implemented by, e.g., decoder 106 of system 100, according to specific decoding needs.

In some implementations, the decoding process involves receiving one or more parameters, which can be signaled to the decoder in high-level syntax (HLS), such as Adaptation Parameter Set (APS), Slice or Tile header, frame header, Picture Parameter Set (PPS), Sequence Parameter Setting (SPS), and Video Parameter Set (VPS). The one or more parameters can include an indication of a mode or a timing for applying a deblocking filter to a current frame. For example, assuming TIP mode is enabled, the one or more parameters can indicate that TIP_frame_mode is set to 1 so the decoder creates a TIP frame and directly outputs the TIP frame.

The one or more parameters can include a configuration of the deblocking filter. Assuming an AVM deblocking filter is used, the one or more parameters can indicate the values of q_threshold and side_threshold or any adjustment of values of q_threshold and side_threshold, thereby indicating the length of filtering. For example, the one or more parameters can indicate q_threshold and side_threshold are each right-shifted by a constant value. In particular, if the constant value equals 1, q_threshold and side_threshold are each right-shifted by one bit.

The one or more parameters can include motion information, such as one or more motion vectors, of the current block. The motion information can be used to determine the locations of the samples that are to be filtered (e.g., to deblock) in the current blocks.

The one or more parameters can also include a configuration of samples within the current block to be filtered. For example, the one or more parameters can indicate only samples at a boundary of the current block are to be filtered, or all samples of the current block are to be filtered. The one or more parameters can also indicate the number of samples of the current block to be filtered. The number can be predetermined by the system (e.g., system 100 of FIG. 1) or can be adaptively determined during the decoding process. For example, the system can predetermine—and signal to the decoder—that: 4 samples on each side of the TIP block boundary are deblocked for the luma component; 2 samples on each side of the TIP block boundary are deblocked for the luma component; 2 samples on each side of the TIP block boundary are deblocked for the chroma component; or only 1 sample on each side of the TIP block boundary is deblocked for the chroma component.

In some implementations, the decoding process involves receiving statistics information of a neighboring block (e.g., a block preceding the current block) and the current block (collectively "the two neighboring blocks"). The statistics information can be received as part of the one or more parameters or can be received separately. The statistics information can include, e.g., motion information indicating a difference between motion vectors of the two neighboring blocks, the modes of the two neighboring blocks, reference frame numbers of the two neighboring blocks, illumination compensation parameters of the two neighboring blocks, weighted prediction parameters of the two neighboring blocks, variance, and mean value.

The received statistics information can be used to determine whether to apply the filtering process, such as the filtering process described with reference to FIGS. 4A-5C. According to an example of using the statistics information, the filtering process is applied when the motion vectors of the two neighboring blocks are different, where the motion vectors are measured by the integer or subpel pixel representation, and the distance between motion vectors can be measured in Euclidean space or any other space.

According to an example of using the statistics information, the filtering process is applied when the reference frames of the two neighboring blocks are different (e.g., one is a TIP frame and one is a non-TIP frame).

According to an example of using the statistics information, the filtering process is applied when the prediction modes of the two neighboring blocks are different (e.g., one is coded with the TIP mode and one is coded with the non-TIP mode).

According to an example of using the statistics information, the filtering process is applied when the illumination compensation parameters of the two neighboring blocks are different. The illumination compensation parameters of the two blocks can be different when there are illumination changes such as fades or cross-fades.

According to an example of using the statistics information, the filtering process is applied when the weighted prediction parameters of the two neighboring blocks are different. The weighted prediction parameters of the two neighboring blocks can be different when the two neighboring blocks are predicted by combining different reference blocks that are weighted differently in the combinations.

In some implementations, the system imposes one or more restrictions to the inter prediction mode (e.g., TIP, OPFL vector refinement, or warp/affine motion). The one or more restrictions can constrain the location of the possible blocky artifacts before the filtering process address these blocky artifacts.

As an example of the one or more restrictions, the motion vectors in the inter prediction mode are limited to a coarser grid (i.e., a grid of smaller size), such as a 4×4 or 8×8 grid. Accordingly, the following filtering process address the 4×4 or 8×8 block boundaries inside a PU.

As an example of the one or more restrictions, the encoder (e.g., encoder 102 of FIG. 1) of the system restricts the difference of the aforementioned statistics information between the two neighboring blocks to be smaller than a threshold.

In some implementations where the TIP mode is enabled for motion compensation, the illumination parameters of the current block are generated using an interpolation/projection process. For example, after identifying two predictor blocks using the motion projection process in the TIP mode, the illumination parameters of the current block are derived by interpolating the illumination parameters of the two predictor blocks. An example interpolation process involves equal weighted averaging.

In some implementations, the decoding process involves applying OBMC to the current block. An example of applying OBMC to a TIP block TIP_0 is illustrated in FIG. 6.

Figure 6:
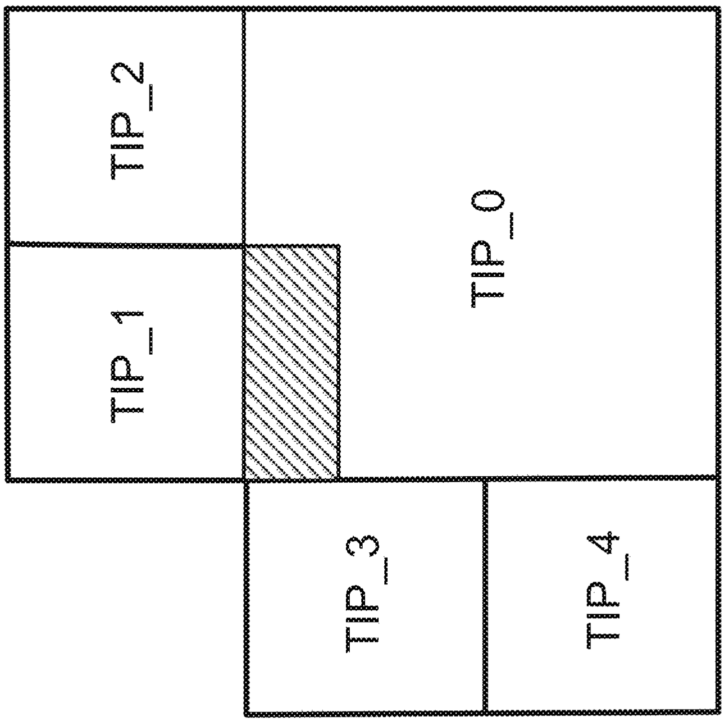
FIG. 6 illustrates an example block to which overlapped block motion compensation (OBMC) is applied.

In FIG. 6, a current block TIP_0 shares its top edge with neighboring blocks TIP_1 and TIP_2, and shares its left edge with neighboring blocks TIP_3 and TIP_4. All of blocks TIP_0 to TIP_4 are coded with the TIP mode. By applying OBMC to TIP_0, inter prediction samples of current block TIP_0 and neighboring blocks TIP_1 to TIP_4 are blended to generate the prediction samples for TIP_0.

According to an example blending procedure, the MV of current block TIP_0 is used to generate prediction samples p0(x, y) based on the samples of current block TIP_0. Then the MV of neighboring block TIP_1 is used to generate prediction samples p1(x, y) based on the samples of TIP_1. To blend TIP_0 and TIP_1, prediction samples in the overlapping area of TIP_0 and TIP_1 (illustrated in shades in FIG. 6) are derived as a weighted average of p0(x, y) and p1(x, y). Likewise, TIP_0 is blended with TIP_2, TIP_3, and TIP_4. The blending procedure can follow the order of TIP_0 and TIP_1 first, TIP_0 and TIP_2 second, TIP_0 and TIP_3 third, and TIP_0 and TIP_4 last.

Alternative to or in addition to blending a current block with neighboring blocks, applying OBMC to the current block can involve refining the current block in case the MVs of the neighboring blocks are different from the MV of the current block (MV0). The MVs of the neighboring blocks can be measured by integer representation of MV0 in a motion field.

Figure 7:
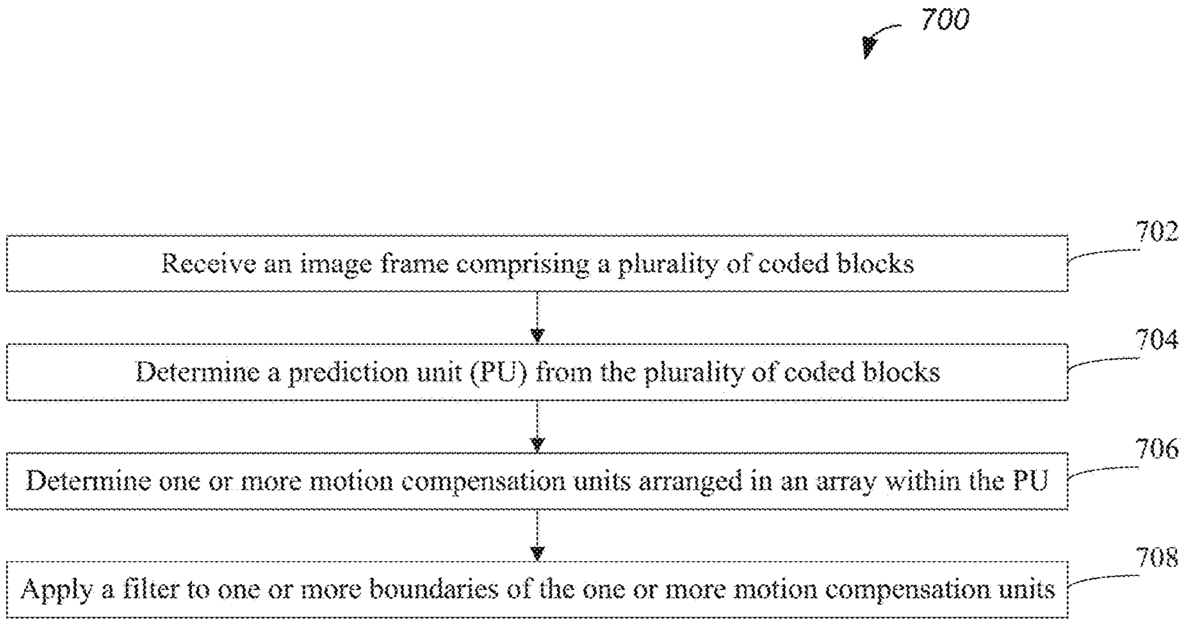
FIG. 7 illustrates a flowchart of an example method, according to some implementations.

FIG. 7 illustrates a flowchart of an example method 700, according to some implementations. For clarity of presentation, the description that follows generally describes method 700 in the context of the other figures in this description. For example, method 700 can be performed by system 100 of FIG. 1. It will be understood that method 700 can be performed, for example, by any suitable system, environment, software, hardware, or a combination of systems, environments, software, and hardware, as appropriate. One or more steps of method 700 can be substantially the same as or similar to the operations described with reference to FIGS. 4A-6. In some implementations, various steps of method 700 can be run in parallel, in combination, in loops, or in any order.

At 702, method 700 involves receiving an image frame comprising a plurality of coded blocks. For example, the image frame can be similar to current frame 210, and can be received from network 104 and coded by encoder 102.

At 704, method 700 involves determining a PU from the plurality of coded blocks. For example, the PU can be similar to PU 220.

At 706, method 700 involves determining one or more motion compensation units arranged in an array within the PU. For example, the array of the one or more motion compensation units can be similar to the 2×2 array of sub-PUs 221-224.

At 708, method 700 involves applying a filter to one or more boundaries of the one or more motion compensation units. For example, one or more boundaries can be similar to outer boundaries 230 and/or inner boundaries 240.

Figure 8:
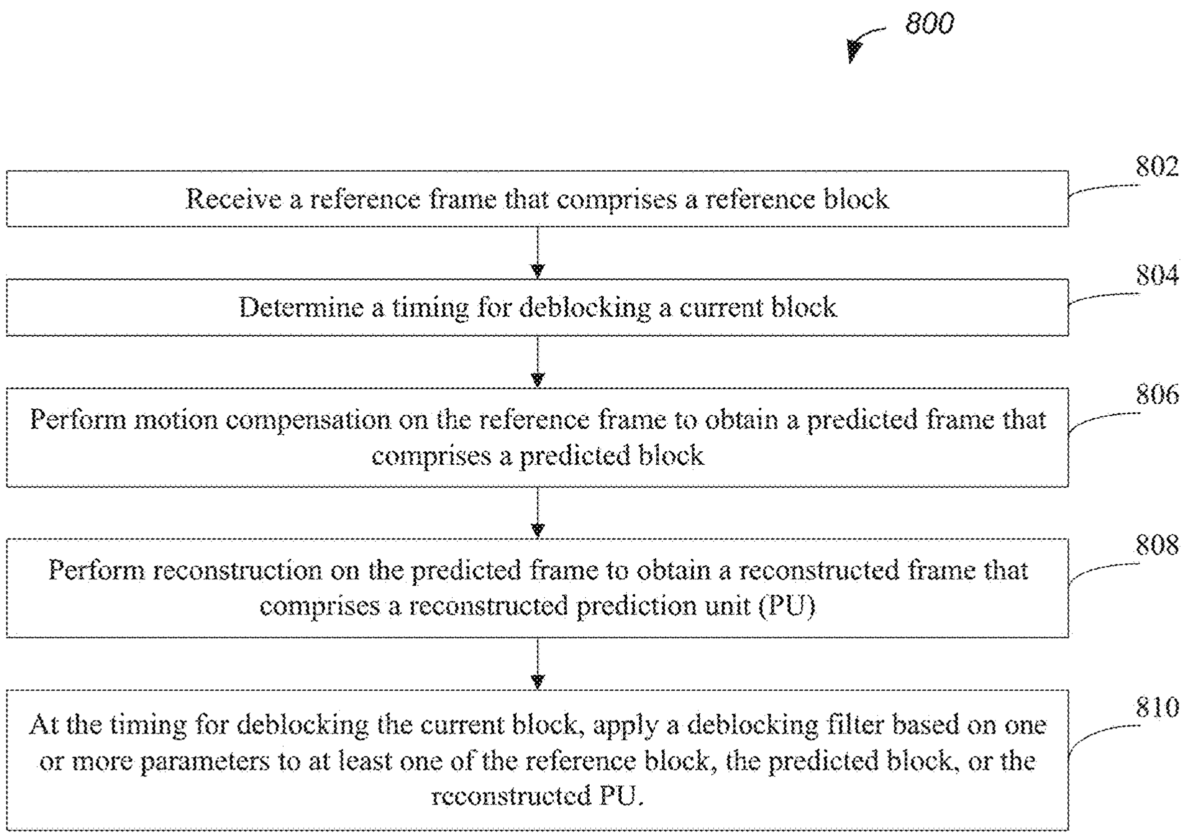
FIG. 8 illustrates a flowchart of another example method, according to some implementations.

FIG. 8 illustrates a flowchart of another example method 800, according to some implementations. For clarity of presentation, the description that follows generally describes method 800 in the context of the other figures in this description. For example, method 800 can be performed by system 100 of FIG. 1. It will be understood that method 800 can be performed, for example, by any suitable system, environment, software, hardware, or a combination of systems, environments, software, and hardware, as appropriate. One or more steps of method 800 can be substantially the same as or similar to the operations described with reference to FIGS. 4A-6. In some implementations, various steps of method 800 can be run in parallel, in combination, in loops, or in any order.

At 802, method 800 involves receiving a reference frame that comprises a reference block. For example, the reference frame can be similar to reference frame 200, and can be received from network 104.

At 804, method 800 involves determining a timing for deblocking a current block. For example, the current block can be similar to PU 220, and the timing can be determined either as illustrated in FIG. 4A or as illustrated in FIG. 4B.

At 806, method 800 involves performing motion compensation on the reference frame to obtain a predicted frame that comprises a predicted block. For example, the performance of motion compensation can be similar to operations 508, 528, or 548.

At 808, method 800 involves performing reconstruction on the predicted frame to obtain a reconstructed frame that comprises a reconstructed. For example, the reconstruction can be similar to operations 509, 530, or 549.

At 810, method 800 involves applying, at the timing for deblocking the current block, a deblocking filter based on one or more parameters to at least one of: the reference block, the predicted block, or the reconstructed PU. For example, depending on the determined timing and the one or more parameters, the application of the deblocking filter can be similar to procedures 500A, 500B, or 500C.

The present disclosure can be implemented in a system having one or more processors and one or more storage devices. The one or more storage devices store instructions that, when executed by the one or more processors, can cause the one or more processors to perform operations, such as those described above.

The present disclosure can be implemented in a non-transitory computer storage medium encoded with instructions. The instructions, when executed by one or more processors, can cause the one or more processors to perform operations, such as those described above.

Figure 9:
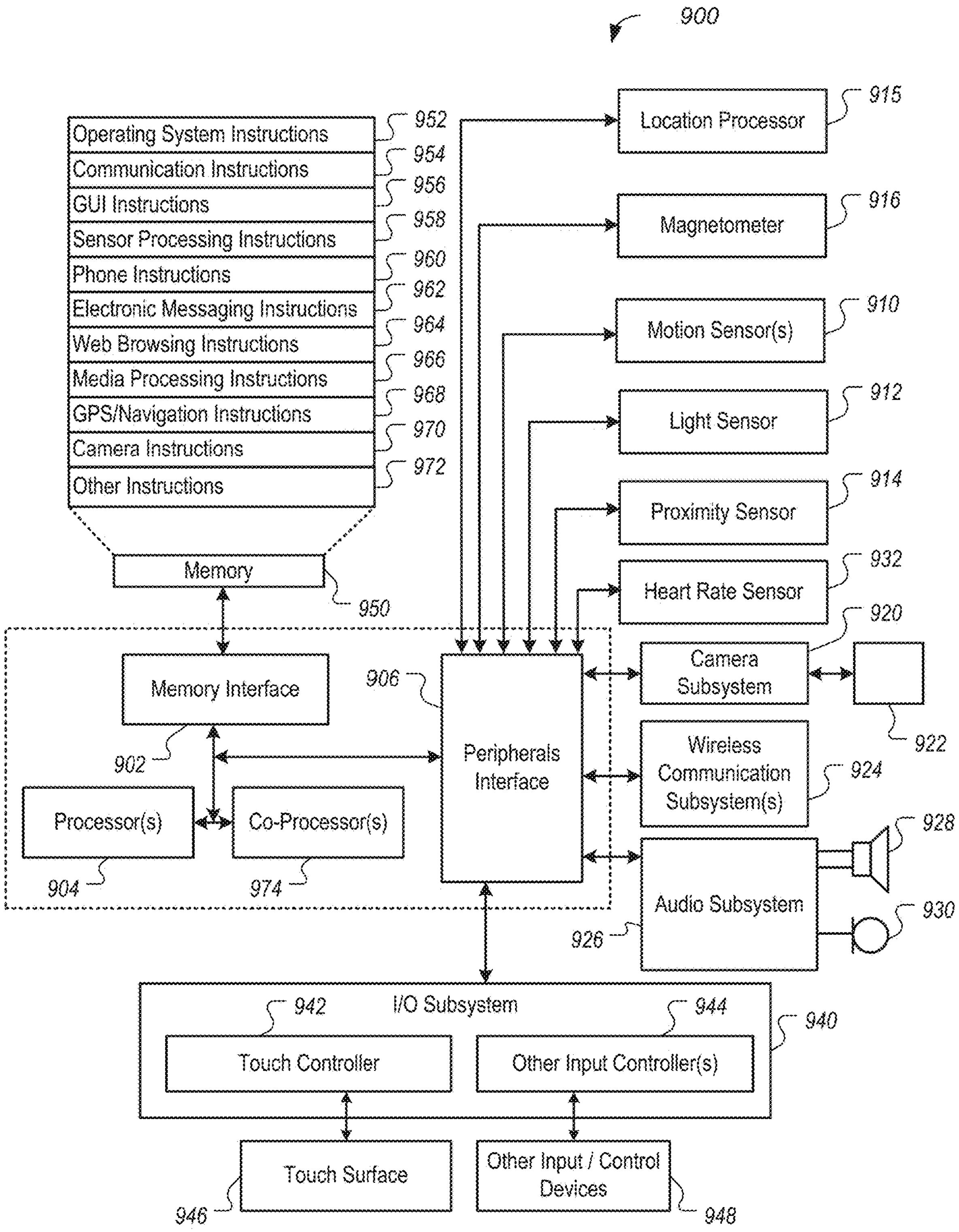
FIG. 9 is a block diagram of an example device architecture 900, according to some implementations.

FIG. 9 is a block diagram of an example device architecture 900 for implementing the features and processes described above. For example, the architecture 900 can be used to implement the system 100 and/or one or more components of the system 100. The architecture 900 may be implemented in any device for generating the features described above, including but not limited to desktop computers, server computers, portable computers, smart phones, tablet computers, game consoles, wearable computers, holographic displays, set top boxes, media players, smart TVs, and the like.

The architecture 900 can include a memory interface 902, one or more data processor 904, one or more data co-processors 974, and a peripherals interface 906. The memory interface 902, the processor(s) 904, the co-processor(s) 974, and/or the peripherals interface 906 can be separate components or can be integrated in one or more integrated circuits. One or more communication buses or signal lines may couple the various components.

The processor(s) 904 and/or the co-processor(s) 974 can operate in conjunction to perform the operations described herein, such as the decoding process described with reference to FIGS. 4A-8. For instance, the processor(s) 904 can include one or more central processing units (CPUs) that are configured to function as the primary computer processors for the architecture 900. As an example, the processor(s) 904 can be configured to perform generalized data processing tasks of the architecture 900. Further, at least some of the data processing tasks can be offloaded to the co-processor(s) 974. For example, specialized data processing tasks, such as processing motion data, processing image data, encrypting data, and/or performing certain types of arithmetic operations, can be offloaded to one or more specialized co-processor(s) 974 for handling those tasks. In some cases, the processor(s) 904 can be relatively more powerful than the co-processor(s) 974 and/or can consume more power than the co-processor(s) 974. This can be useful, for example, as it enables the processor(s) 904 to handle generalized tasks quickly, while also offloading certain other tasks to co-processor(s) 974 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 904 for further analysis.

Sensors, devices, and subsystems can be coupled to peripherals interface 906 to facilitate multiple functionalities. For example, a motion sensor 910, a light sensor 912, and a proximity sensor 914 can be coupled to the peripherals interface 906 to facilitate orientation, lighting, and proximity functions of the architecture 900. For example, in some implementations, a light sensor 912 can be utilized to facilitate adjusting the brightness of a touch surface 946. In some implementations, a motion sensor 910 can be utilized to detect movement and orientation of the device. For example, the motion sensor 910 can include one or more accelerometers (e.g., to measure the acceleration experienced by the motion sensor 910 and/or the architecture 900 over a period of time), and/or one or more compasses or gyros (e.g., to measure the orientation of the motion sensor 910 and/or the mobile device). In some cases, the measurement information obtained by the motion sensor 910 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 910 can be directly integrated into a co-processor 974 configured to processes measurements obtained by the motion sensor 910. For example, a co-processor 974 can include one more accelerometers, compasses, and/or gyroscopes, and can be configured to obtain sensor data from each of these sensors, process the sensor data, and transmit the processed data to the processor(s) 904 for further analysis.

Other sensors may also be connected to the peripherals interface 906, such as a temperature sensor, a biometric sensor, or other sensing device, to facilitate related functionalities. As an example, as shown in FIG. 9, the architecture 900 can include a heart rate sensor 932 that measures the beats of a user's heart. Similarly, these other sensors also can be directly integrated into one or more co-processor(s) 974 configured to process measurements obtained from those sensors.

A location processor 915 (e.g., a GNSS receiver chip) can be connected to the peripherals interface 906 to provide geo-referencing. An electronic magnetometer 916 (e.g., an integrated circuit chip) can also be connected to the peripherals interface 906 to provide data that may be used to determine the direction of magnetic North. Thus, the electronic magnetometer 916 can be used as an electronic compass.

A camera subsystem 920 and an optical sensor 922 (e.g., a charged coupled device [CCD] or a complementary metal-oxide semiconductor [CMOS] optical sensor) can be utilized to facilitate camera functions, such as recording photographs and video clips.

Communication functions may be facilitated through one or more communication subsystems 924. The communication subsystem(s) 924 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 924 can depend on the communication network(s) or medium(s) over which the architecture 900 is intended to operate. For example, the architecture 900 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 900 can be configured as a base station for other wireless devices. As another example, the communication subsystems may allow the architecture 900 to synchronize with a host device using one or more protocols, such as, for example, the TCP/IP protocol, HTTP protocol, UDP protocol, and any other known protocol.

An audio subsystem 926 can be coupled to a speaker 928 and one or more microphones 930 to facilitate voice-enabled functions, such as voice recognition, voice replication, digital recording, and telephony functions.

An I/O subsystem 940 can include a touch controller 942 and/or other input controller(s) 944. The touch controller 942 can be coupled to a touch surface 946. The touch surface 946 and the touch controller 942 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 946. In one implementation, the touch surface 946 can display virtual or soft buttons and a virtual keyboard, which can be used as an input/output device by the user.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In some implementations, the architecture 900 can present recorded audio and/or video files, such as MP3, AAC, and MPEG video files. In some implementations, the architecture 900 can include the functionality of an MP3 player and may include a pin connector for tethering to other devices. Other input/output and control devices may be used.

A memory interface 902 can be coupled to a memory 950. The memory 950 can include high-speed random access memory or non-volatile memory, such as one or more magnetic disk storage devices, one or more optical storage devices, or flash memory (e.g., NAND, NOR). The memory 950 can store an operating system 952, such as Darwin, RTXC, LINUX, UNIX, OS X, WINDOWS, or an embedded operating system such as VxWorks. The operating system 952 can include instructions for handling basic system services and for performing hardware dependent tasks. In some implementations, the operating system 952 can include a kernel (e.g., UNIX kernel).

The memory 950 can also store communication instructions 954 to facilitate communicating with one or more additional devices, one or more computers or servers, including peer-to-peer communications. The communication instructions 954 can also be used to select an operational mode or communication medium for use by the device, based on a geographic location (obtained by the GPS/Navigation instructions 968) of the device. The memory 950 can include graphical user interface instructions 956 to facilitate graphic user interface processing, including a touch model for interpreting touch inputs and gestures; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 969 to facilitate GPS and navigation-related processes; camera instructions 970 to facilitate camera-related processes and functions; and other instructions 972 for performing some or all of the processes described herein.

Each of the above identified instructions and applications can correspond to a set of instructions for performing one or more functions described herein. These instructions need not be implemented as separate software programs, procedures, or modules. The memory 950 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Any of the above-described examples may be combined with any other example (or combination of examples), unless explicitly stated otherwise. The foregoing description of one or more implementations provides illustration and description, but is not intended to be exhaustive or to limit the scope of implementations to the precise form disclosed. Modifications and variations are possible in light of the above teachings or may be acquired from practice of various implementations.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

receiving a reference frame that comprises a reference block;

determining a timing for deblocking a current block;

performing motion compensation on the reference frame to obtain a predicted frame that comprises a predicted block;

performing reconstruction on the predicted frame to obtain a reconstructed frame that comprises a reconstructed prediction unit (PU); and at the timing for deblocking the current block, applying a deblocking filter based on one or more parameters to at least one of:

the reference block, the predicted block, or the reconstructed PU.

2. The method of claim 1, wherein the timing for deblocking the current block is prior to the performance of the motion compensation, and wherein, at the timing for deblocking the current block, the deblocking filter is applied to the reference block.

3. The method of claim 1 wherein the timing for deblocking the current block is after the performance of the motion compensation and prior to the performance of reconstruction, and wherein, at the timing for deblocking the current block, the deblocking filter is applied to the predicted block.

4. The method of claim 1, wherein the timing for deblocking the current block is after the performance of the reconstruction, and wherein, at the timing for deblocking the current block, the deblocking filter is applied to the reconstructed PU.

5. The method of claim 1, wherein the motion compensation is based on at least one of:

a temporal interpolated prediction (TIP) mode, an optical flow (OPFL) vector refinement mode, or a warp/affine motion mode.

6. The method of claim 1, wherein the reconstructed frame comprises a reconstructed block that is not the reconstructed PU, the method further comprising:

applying the deblocking filter to the reconstructed block.

7. The method of claim 5, wherein the one or more parameters indicate a configuration of the TIP mode.

8. The method of claim 1, further comprising:

determining a threshold value based on the one or more parameters; and determining a length of filtering based at least on the threshold value.

9. The method of claim 1, further comprising:

receiving the one or more parameters in high-level syntax (HLS).

10. The method of claim 1, further comprising:

receiving statistics information of a neighboring block and the current block, wherein the statistics information comprises at least one of:

motion information, a prediction mode of the neighboring block and a prediction mode of the current block, a reference frame number of the neighboring block and a reference frame number of the current block, an illumination compensation parameter of the neighboring block and an illumination compensation parameter of the current block, or a weighted prediction parameter of the neighboring block and a weighted prediction parameter of the current block.

11. The method of claim 10, wherein the motion information comprises a difference between a motion vector of the current block and a motion vector of the neighboring block.

12. The method of claim 10, wherein the reference frame number of the neighboring block and the reference frame number of the current block are different.

13. The method of claim 10, wherein the prediction mode of the neighboring block and the prediction mode of the current block are different.

14. The method of claim 10,
wherein the illumination compensation parameter of the neighboring block and the illumination compensation parameter of the current block are different.

15. The method of claim 10,
wherein the weighted prediction parameter of the neighboring block and the weighted prediction parameter of the current block are different.

16. The method of claim 5, further comprising:
imposing a restriction to the TIP mode, the OPFL vector refinement mode, or the warp/affine motion mode.

17. The method of claim 16, wherein imposing the restriction comprises limiting a motion vector of the TIP mode, the OPFL vector refinement mode, or the warp/affine motion mode.

18. The method of claim 16, wherein imposing the restriction comprises limiting a difference of statistics information between a neighboring block and the current block.

19. The method of claim 18,
wherein the motion compensation is based on the TIP mode,
wherein the statistics information comprises an illumination parameter of the current block, and
wherein the method further comprises: generating the illumination parameter of the current block using an interpolation/projection process.

20. The method of claim 19, wherein generating the illumination parameter of the current block comprises:
interpolating one or more illumination parameters of two predictor blocks.

21. The method of claim 1, wherein the one or more parameters comprise motion information of the current block.

22. The method of claim 1, wherein the deblocking filter is applied to samples at a boundary of the current block.

23. The method of claim 1, wherein the deblocking filter is applied to all of samples of the current block.

24. The method of claim 1, wherein a number of samples of the current block to deblock is predetermined.

25. The method of claim 1, wherein a number of samples of the current block to deblock is adaptively determined.

26. The method of claim 1, further comprising: applying overlapped block motion compensation (OBMC) to the current block.

27. A system comprising:
one or more processors; and
memory storing instructions that when executed by the one or more processors, cause the one or more processors to perform operations comprising:
receiving a reference frame that comprises a reference block;
determining a timing for deblocking a current block;
performing motion compensation on the reference frame to obtain a predicted frame that comprises a predicted block;
performing reconstruction on the predicted frame to obtain a reconstructed frame that comprises a reconstructed prediction unit (PU); and
at the timing for deblocking the current block, applying a deblocking filter based on one or more parameters to at least one of:
the reference block, the predicted block, or the reconstructed PU.

28. One or more non-transitory computer-readable media storing instructions that, when executed by one or more processors, cause the one or more processors to perform operations comprising:
receiving a reference frame that comprises a reference block;
determining a timing for deblocking a current block;
performing motion compensation on the reference frame to obtain a predicted frame that comprises a predicted block;
performing reconstruction on the predicted frame to obtain a reconstructed frame that comprises a reconstructed prediction unit (PU); and
at the timing for deblocking the current block, applying a deblocking filter based on one or more parameters to at least one of:
the reference block, the predicted block, or the reconstructed PU.

* * * * *